(12) United States Patent
Peng et al.

(10) Patent No.: US 6,171,367 B1
(45) Date of Patent: Jan. 9, 2001

(54) METHOD AND APPARATUS FOR DELIVERING AND RECYCLING A BUBBLE-FREE LIQUID CHEMICAL

(75) Inventors: Ray Peng, Miao-li; T. Y. Liu, Hsin-chu; Y. F. Lin, Chin-chu; R. C. Wang, Hsin-chu, all of (TW)

(73) Assignee: Taiwan Semiconductor Manufacturing Co., Ltd, Hsinchu (TW)

( * ) Notice: Under 35 U.S.C. 154(b), the term of this patent shall be extended for 0 days.

(21) Appl. No.: 08/870,346

(22) Filed: Jun. 5, 1997

(51) Int. Cl.[7] .................................................. B01D 19/00
(52) U.S. Cl. .................. 95/46; 95/258; 96/4; 210/94; 210/97; 210/188; 210/194; 210/744
(58) Field of Search ..................... 222/1, 56, 67, 222/136, 145, 204; 137/205, 413; 141/65; 210/805, 188, 744, 94, 97, 194; 95/46, 254, 258, 259; 96/4, 6

(56) References Cited

U.S. PATENT DOCUMENTS

| | | | |
|---|---|---|---|
| 3,912,468 | * 10/1975 | Tsuchiya et al. . | |
| 3,926,664 | * 12/1975 | Verreydt | 134/21 |
| 4,205,966 | * 6/1980 | Horikawa . | |
| 4,601,409 | * 7/1986 | DiRegolo | 222/1 |
| 4,955,992 | * 9/1990 | Goodale et al. | 55/160 |
| 5,096,602 | * 3/1992 | Yamauchi et al. | 210/767 |
| 5,383,574 | * 1/1995 | Raphael | 222/1 |
| 5,383,958 | * 1/1995 | Battaglia | 95/259 |
| 5,425,803 | * 6/1995 | van Schravendijk et al. | 95/46 |
| 5,590,686 | * 1/1997 | Prendergast | 137/597 |
| 5,636,762 | * 6/1997 | Juhola et al. | 222/1 |
| 5,645,625 | * 7/1997 | van Schravendijk et al. | 95/46 |
| 5,792,237 | * 8/1998 | Hung et al. | 95/254 |

* cited by examiner

*Primary Examiner*—Robert J. Popovics
(74) *Attorney, Agent, or Firm*—Tung & Associates

(57) ABSTRACT

The present invention discloses a method and apparatus for delivering and recycling a liquid such that a substantially air bubble-free liquid flow can be supplied to a process machine and a liquid flow that contains air bubbles can be recycled back into a liquid reservoir for venting away the air bubbles. The method and apparatus is not only capable of supplying air bubble-free liquid to a process machine, but also capable of saving a costly process liquid from being purged out into a waste tank in order to eliminate air bubbles entrapped in the liquid.

7 Claims, 1 Drawing Sheet

METHOD AND APPARATUS FOR DELIVERING AND RECYCLING A BUBBLE-FREE LIQUID CHEMICAL

FIELD OF THE INVENTION

The present invention generally relates to a method and apparatus for delivering and recycling a liquid chemical by a recirculating system and more particularly, relates to a method and apparatus for delivery and recycling liquid chemical that is capable of delivering an air bubble-free liquid to a process machine and to reduce the liquid chemical usage by recycling unused liquid into a reservoir for the liquid chemical.

BACKGROUND OF THE INVENTION

In most manufacturing processes, a variety of chemicals are used in a multiplicity of manufacturing steps. For instance, there are frequently several hundred manufacturing steps involved in the fabrication of an integrated circuit. The manufacturing steps may include etching, cleaning, deposition and various other necessary steps. A variety of chemicals, including liquid chemicals, are used in the processing steps either to etch a specific circuit on an IC chip, to clean after certain processing steps, to deposit layers from reactant chemicals, or to carry out any other necessary fabrication steps. An important consideration in using chemical liquids is the transporting/storage of the material. For instance, when a photoresist liquid is used in IC processing, the photosensitivity and the lifetime of the material depends on its storage temperature and its exposure to light. It is therefore important to maintain a photoresist liquid within a temperature range of between 5° C. and 20° C. and in a relatively dark environment.

In the transporting of IC processing liquids, plastic piping such as Teflon pipes are frequently used due to the fact that the liquid being transported is frequently volatile and flammable. The Teflon pipes are also ideal for chemical liquids that are highly corrosive. The use of plastic piping greatly reduces the risk of explosion or fire that are sometimes caused by sparks generated between metal pipes. When Teflon pipes are used, they are frequently connected together by Teflon couplings between various sections of the pipes. The pipes and the couplings are connected by male and female threads provided on the pipes and in the couplings respectively. Based on the low rigidity of plastic materials a connection between a Teflon pipe and a Teflon coupling can only be made by hand tightening the two parts together. Any tightening force larger than that provided by hand tightening would cause the stripping of threads on the Teflon pipes. A joint formed between a Teflon pipe and a Teflon coupling therefore is not extremely tight and consequently, would allow air to enter the pipe and forms bubbles or microbubbles. The micro-bubbles are bubbles formed on a microscopic scale and sometimes cannot be observed by human eyes.

An illustration of a conventional liquid supply system 10 is shown in FIG. 1. In system 10 as presently used in a semiconductor fabrication facility, a liquid reservoir or holding tank 12 is first provided for storing liquid 14. Liquid 14 can be fed to the tank 12 from a liquid inlet 18 through a shut-off valve 20. At the uppermost portion of the liquid reservoir 12, a vent outlet 24 is provided for venting the tank to the atmosphere. A filter 26 is provided in conduit 28 for the vent system such that only air and not liquid can be vented out the vent outlet 24. Conduit 32 allows the delivery of liquid 14 in tank 12 to a pump 34 that is driven by motor 36. The pump 34 is controlled by a host computer (not shown) of the process machine such that it dispenses liquid of a predetermined volume in a predetermined interval of time as instructed by the computer. The pump 34 can be suitably provided of the bellow-type which has a preset volume of displacement during each activation of the bellow such that a predetermined amount of liquid is delivered through conduit 40 to a liquid/air separating device, or filter 42. For instance, in a liquid supply system for a photoresist coating material, a bellow-type pump can be preset to deliver 8 $cm^3$ of the photoresist upon activation of the bellow to coat a wafer.

The liquid/air separating device, or filter 42 can separate trapped air from the liquid when such a mixture is delivered to filter 42 through conduit 40. The trapped air after being separated out of the liquid cumulates at an upper portion of filter 42. The filter 42 is designed as a one-way filter such that back flow of liquid into conduit 40 is not possible. A liquid flow that is substantially without air bubbles can be pumped by the bellow pump 34 to enter conduit 46 through shut-off valve 48 for dispensing onto a wafer (not shown). Since conduits are normally made of a plastic material, such as Teflon, and therefore are translucent or semi-transparent, any trapped air bubbles in the liquid can be visually observed by the machine operator. When air bubbles are observed, the operator opens valve 52 and discharges a significant amount of the liquid into a waste collection tank 54 through conduit 56 in order to get rid of the air bubbles.

As previously discussed, since plastic piping can not be tightly joined together, air leaks into the conduit and forms trapped air bubbles in the liquid. In the conventional liquid supply system 10 shown in FIG. 1, each time air bubbles are observed in the liquid conveying conduit, a large quantity of liquid must be drained through conduit 56 into the waste collection tank 54 in order to purge out all the trapped air bubbles. This presents a significant source of waste of the process liquid used in a manufacturing process and adds significantly to the cost of fabrication since most process liquids used in IC fabrication are high cost materials.

It is therefore an object of the present invention to provide a method for supplying a liquid to a process machine that does not have the drawbacks and shortcomings of the conventional methods.

It is another object of the present invention to provide a method for supplying liquid to a process machine that is capable of supplying a liquid which is substantially without trapped air.

It is a further object of the present invention to provide a method for supplying a liquid to a process machine that is capable of recirculating a liquid containing air bubbles into a liquid reservoir such that the draining of the liquid is not necessary.

It is another further object of the present invention to provide a method for recirculating a process liquid such that a substantially air bubble-free liquid can be delivered to a process machine.

It Is yet another object of the present invention to provide a method for recirculating a liquid containing air bubbles that have leaked into the plastic pipes is sent back to a liquid reservoir for venting.

It is still another object of the present invention to provide a method for recirculating a liquid that is capable of removing air bubbles in the liquid while not wasting any of the liquid to a drain tank.

It is still another further object of the present invention to provide a recirculating liquid supply and recovery system that is capable of supplying an air bubble-free liquid to a process machine while recirculating a liquid flow containing air bubbles back into a liquid reservoir.

SUMMARY OF THE INVENTION

In accordance with the present invention, a method for recirculating a liquid to deliver a substantially air bubble-free liquid to a process machine without wasting any liquid that contains air bubbles is provided.

In a preferred embodiment, a method for recirculating a liquid to deliver a substantially air bubble-free liquid to a process machine can be carried out by the operating steps of first providing a liquid reservoir for storing a liquid, then transporting the liquid through a first conduit to a pump, then pumping a predetermined amount of liquid through a second conduit to a first liquid/air separating device having a first outlet and a second outlet, then dispensing a substantially air bubble-free liquid from the first outlet through a third conduit, and then recirculating a liquid containing air bubbles from the second outlet through a fourth conduit to the liquid reservoir.

In another preferred embodiment, a method for dispensing and recirculating a liquid in a closed-loop system can be carried out by the operating steps of first transporting a liquid from a reservoir to a filter device that has at least a first outlet and a second outlet, then dispensing a liquid flow from the first outlet through a first valve that is fully opened, and then recirculating a liquid flow that has air bubbles from the second outlet through a second valve that is opened less than 50% of its total opening to the reservoir.

The present invention is further directed to a system for delivering and recovering a liquid including a liquid reservoir for storing a liquid, a first conduit for transporting the liquid to a filter through a pump, a second conduit for dispensing a liquid that is substantially without air bubbles from the filter through a full-on/full-off valve, and a third conduit for recirculating a liquid containing air bubbles from the filter through an adjustable valve to the reservoir.

BRIEF DESCRIPTION OF DRAWINGS

These and other objects, features and advantages of the present invention will become apparent from the following detailed description and the appended drawings in which.

DETAILED DESCRIPTION OF THE PREFERRED EMBODIMENT

The present invention provides a novel method for simultaneously delivering a liquid chemical that is substantially without air bubbles to a process machine and recycling a liquid that contains air bubbles back into a liquid reservoir for venting of the trapped air in the liquid.

The main objectives of the present invention novel method are two folds. First, to deliver a process liquid that is substantially without air bubbles to a process machine such as the delivery of a photoresist liquid for coating the surface of a wafer. Any presence of air bubbles in the photoresist liquid not only would produce a photoresist film that is inconsistent in quality and thickness, but also would produce a film that is thinner than its supposed thickness based on the fact that air bubbles take up volume in the liquid and that the liquid is normally delivered by a volumetric pump. The second main objective of the present invention novel method is to recycle liquid that contains air bubbles such that they are not wasted and drained into a waste collection tank as previously done in conventional methods. This saves the processing costs of an IC device since most processing liquids used in IC fabrication are of relatively high cost.

Figure 1:
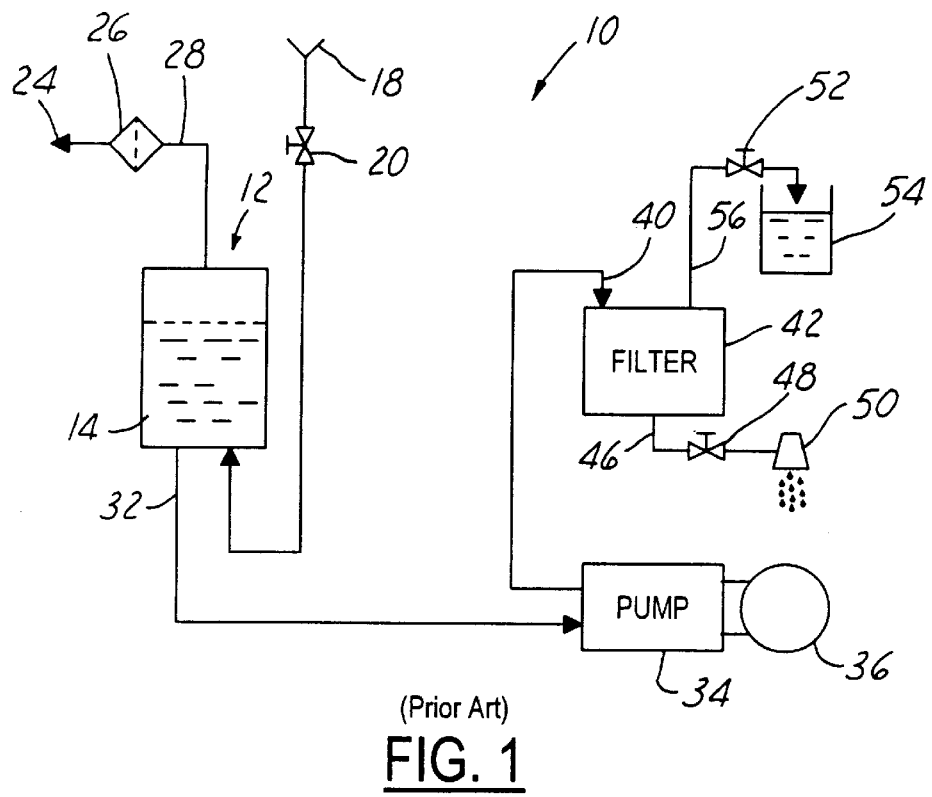
FIG. 1 is an illustration of a conventional liquid supply system to a process machine.
Figure 2:
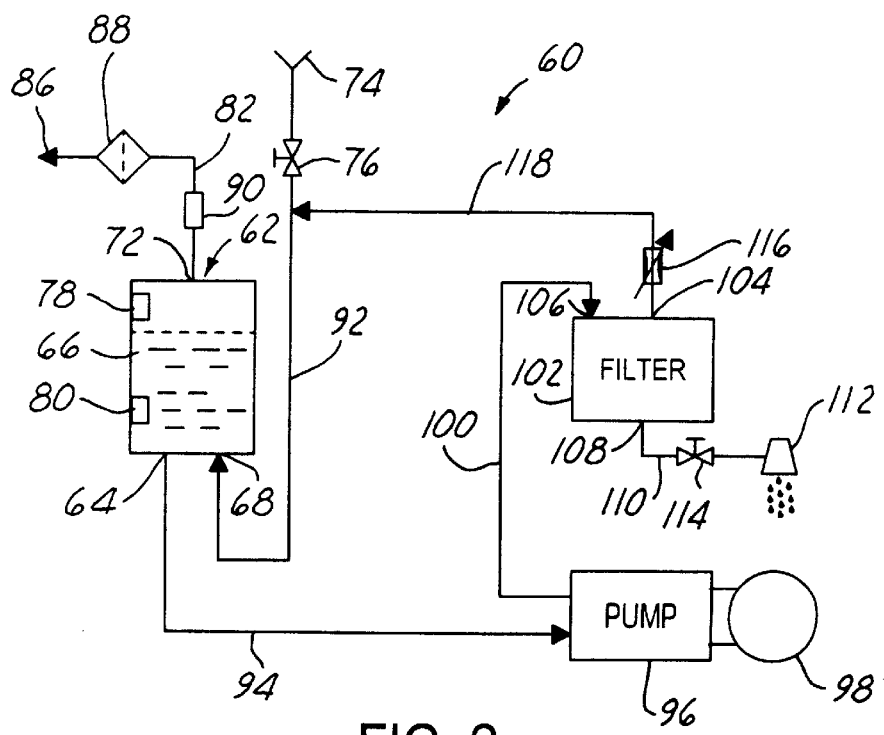
FIG. 2 is an illustration of the present invention liquid supply system utilizing closed-loop recirculation.

Referring now to FIG. 2, wherein a present invention liquid delivering and recycling system 60 is shown. In the delivering/recycling system 60, a liquid storage tank 62 is first provided to store a process liquid 66. The tank 62 is equipped with a liquid inlet 68, a liquid outlet 64 and a vent 72. A process liquid 66 is fed into tank 62 from a liquid inlet 74 which is controlled by a shut-off valve 76. The liquid tank 62 is further equipped with fluid level sensors 78 and 80, i.e., a high level sensor and a low level sensor. An output from each sensor is fed into a host computer (not shown) of the process machine. The low level sensor 80 senses a critical liquid level in tank 62 and when the liquid level is below such critical level, sensor 80 sends a signal to the host computer to stop the operation of the pump 96. This occurs when there is an excessive amount of air bubbles being recirculated back into tank 62 from the system conduit 94, 100, 118 and 92. A main source for the air bubbles is the connections between the plastic (i.e., Teflon) pipes. Another source of air bubbles into the system is the solenoid controlled air operated shut-off valves.

The high level sensor 78 senses a maximum allowable level in tank 62 such as to prevent an overflowing of liquid 66 into the vent opening 72 by sending out a signal to the host computer and stopping the liquid from entering into tank 62 by shutting-off valve 76. The tank 62 is further equipped with a vent 72 connected by a conduit 82 to a vent outlet 86. A liquid/air separating device 88 is utilized in conduit 82 between the vent 72 and outlet 86. An overflow sensor 90 is also provided in conduit 82 between the vent 72 and the filter 88. The function of the overflow sensor 90 is to detect an overflow of liquid into the conduit 82 to prevent overflow from tank 62 in the event that the high level sensor 78 fails. The overflow sensor 90 also outputs a signal to the host computer to trigger an alarm device and to shut-off valve 76 when such overflow condition is detected.

The liquid 66 in tank 62 and in conduits 94, 100, 118 and 92 is pressurized by an inert gas such as nitrogen to a pressure slightly higher than the atmospheric pressure to facilitate the flowing of liquid in the conduit. The pressure further facilitates the flowing of liquid 66 into pump 96. Pump 96 is driven by motor 98 and can be suitably selected of a bellow-type pump such that a predetermined quantity of liquid 66 can be pushed out through conduit 100 to a liquid/air separating device 102. The liquid/air separating device 102 is a commercially available demixer which is capable of separating air from a liquid. For instance, a bellow-type pump can be suitably used in a photoresist liquid supply line which has a pumping capacity of 8 cm$^3$ each time when the pump is activated. The amount of liquid that needs to be pumped can be preset to suit the specific application. In the example of the photoresist liquid, 8 cm$^3$ of the photoresist material is the desirable amount for coating the surface of an 8-inch wafer.

The liquid/air separating device 102 can be a filter that is capable of separating air bubbles entrapped in liquid 66 from the liquid. The entrapped air is normally cumulated at an uppermost portion of the filter and can be outputted from outlet 104. A liquid flow that is substantially without air bubbles is outputted from outlet 108 into conduit 110 to a spray nozzle 112 for spraying onto a wafer. The liquid flow through conduit 110 is further controlled by a ball valve 114 which can be operated in either a full-on or a full-off position. The operation of valve 114 can be controlled by the host computer.

The recirculating, or recycling action of the present invention apparatus can be explained as follows. A liquid flow that contains air bubbles can be fed through outlet 104, adjustable valve 116, conduit 118 and then into the liquid supply conduit 92. The adjustable valve 116 can be suitably a needle valve that can be adjusted in infinite increments between a full-on and a full-off position. During the normal operation of the present invention apparatus, the needle valve 116 is only slightly opened, i.e., less than 50% or preferably less than 25% of its total opening, such that a constant small flow of liquid containing air bubbles is flown through conduit 118 and 92 into the reservoir tank 62.

The bellow-type pump 96 may be activated once each minute for spraying a photoresist material onto a wafer. The semi-transparent Teflon piping utilized in conduit 92, 94, 100 and 118 allows an machine operator to make visual observation of the condition of the liquid contained in the piping. When a large number of air bubbles are observed in the piping, the operator may first switch off the shut-off valve 114, then switch the needle valve 116 to a full-on position such that all the liquid contained in the conduit are flown back into tank 62. This can be performed on a regular basis or as required.

The air bubbles contained in the liquid are therefore collected in tank 62 and surfaced to the uppermost portion of the tank and vented through conduit 82 to the atmosphere. The inert gas pressure exerted on liquid 66 in tank 62 further facilitates such evacuation. The utilization of the needle valve 116 in the recirculating conduit 118 is important since it regulates the amount of liquid that is recycled and allowed to return to the reservoir 62. The degree of opening of the needle valve 116 is suitably adjusted by the amount of air bubbles cumulated in the plastic conduit during normal operation of the system, i.e., when wafers are coated by the photoresist liquid.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A method for delivering and recirculating a liquid comprising the steps of:

providing a liquid reservoir and storing a liquid therein, transporting the liquid through a first conduit to a pump, pumping a predetermined amount of liquid through a second conduit to a first liquid/air separating device having at least a first outlet and a second outlet, dispensing a substantially air bubble-free liquid from said first outlet through a third conduit having a first valve that is fully opened, and recirculating a liquid containing air bubbles from said second outlet through a fourth conduit having a second valve which is adjustable and is opened less than 50% of its total opening to said liquid reservoir and using a semi-transparent material for at least one of said first, second, third and fourth conduit and visually determining the presence of air bubbles in the liquid.

2. A method according to claim 1 further comprising the step of pressurizing said liquid reservoir with an inert gas to a pressure higher than 1 atm.

3. A method according to claim 1, wherein said first liquid/air separating device is a filter.

4. A method according to claim 1 further comprising the step of venting said liquid reservoir to the atmosphere through a fifth conduit and a second liquid/air separating device.

5. A method according to claim 1 further comprising the step of providing at least one sensing device in said liquid reservoir for sensing the liquid level in said reservoir.

6. A method according to claim 1 further comprising the step of providing an overflow sensor in said fifth conduit for detecting an overflow of liquid into said conduit.

7. A method according to claim 1, wherein said pump is a bellow pump.

* * * * *